(12) United States Patent
Ehrne et al.

(10) Patent No.: US 6,513,932 B1
(45) Date of Patent: Feb. 4, 2003

(54) MOTION PICTURE FILM PROJECTOR

(75) Inventors: Franklin D. Ehrne, Rochester, NY (US); Andrew F. Kurtz, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 271 days.

(21) Appl. No.: 09/672,272

(22) Filed: Sep. 28, 2000

(51) Int. Cl.$^7$ .................................................. G03B 1/24
(52) U.S. Cl. ........................ 352/189; 352/165; 352/204; 352/208; 352/210; 352/212; 396/493
(58) Field of Search ........................ 352/160, 163–165, 352/189, 204, 208, 210, 212, 215; 396/493, 495

(56) References Cited

U.S. PATENT DOCUMENTS

| | | | |
|---|---|---|---|
| 93,594 A | 8/1869 | Brown | |
| 1,700,513 A | 1/1929 | Porter | |
| 1,744,789 A | 9/1930 | Dina | |
| 1,884,605 A | 10/1932 | Dina | |
| 3,642,357 A | * 2/1972 | Meyer | 352/104 |
| 3,773,412 A | 11/1973 | Yang | |
| 3,784,293 A | 1/1974 | Yang | |
| 3,820,145 A | * 6/1974 | Gaullier | 352/208 |
| 4,022,525 A | * 5/1977 | Boudouris | 352/160 |
| 6,014,198 A | 1/2000 | Baumann | |

* cited by examiner

Primary Examiner—Russell Adams
Assistant Examiner—Michelle Nguyen
(74) Attorney, Agent, or Firm—Nelson Adrian Blish

(57) ABSTRACT

An improved motion picture film projector (100) comprises a Geneva Mechanism (120), which intermittently drives a film (114). A light source (116) projects light through the film (114) and a shutter (106) periodically interrupts the light source (116). The shutter (106) has a blade with a shaped edge, which matches the frame shape on the film (114) thus, increasing the amount of light that is transmitted through the film (114). A second edge of the blade also matches the frame shape on the film (114) further increasing the amount of light transmitted through the film (114).

20 Claims, 10 Drawing Sheets

MOTION PICTURE FILM PROJECTOR

CROSS REFERENCE TO RELATED APPLICATIONS

Reference is made to commonly-assigned copending U.S. patent application Ser. No. 09/329,841, filed Jun. 11, 1999, entitled GENEVA MECHANISM AND MOTION PICTURE PROJECTOR USING SAME, by Kirkpatrick et al., the disclosure of which are incorporated herein.

FIELD OF THE INVENTION

The present invention relates in general to the design of light shutters as used in motion picture film projectors. More particularly, the present invention relates to improved shutter designs, which can be used in cinema projectors of standard design, as well as in projectors with improved Geneva Mechanisms and improved illumination systems.

BACKGROUND OF THE INVENTION

Generally speaking, the state of the art motion picture film projector is little changed from those produced in the 1950's, when the advent of robust color films and xenon arc lamps encouraged the manufacturer's to make design changes. The most basic mechanisms within film projectors, such as the intermittent drive, the shutter, and the projection lens, can be seen in the earliest patents; such as U.S. Pat. No. 93,594 (O. Brown, 1869). Although at present, some manufacturers are producing re-designed projectors with modularity, stepper and servo motor drives, and modern control circuitry, the basic system design is still relatively unchanged. Thus, there continue to be opportunities to make design improvements to a classic opto-mechanical system like the motion picture film projector.

In a standard projector, the film is intermittently advanced by a Geneva Mechanism, also known as a "Maltese Cross," until an image frame is in alignment with the projection aperture. The film is then held stationary for a discrete time period during which light is passed through the aperture, film frame, projection lens, and onto a screen. This intermittent frame-by-frame motion of the film is enabled by the Geneva Mechanism, which comprises one portion, the driver, which rotates continuously, and which causes intermittent rotation of a second portion, the star wheel. In a motion picture projector the star wheel is mounted on a central shaft with a sprocket, the teeth of which are engaged with perforations in the film. Therefore, when the driver moves the star wheel, both the star wheel and the film experience a resulting intermittent motion. As motion picture film is typically projected at a rate of 24 frames per second, a new film frame is positioned in the projection aperture every $\frac{1}{24}$ second, or approximately 42 ms. The standard Geneva Mechanism used in cinema, much as described is U.S. Pat. No. 1,774,789 (Dina), moves each film frame into the projection aperture with an indexing time of one-fourth of the frame period, or approximately 10.5 ms.

It is necessary to block or shutter the light to the screen during these indexing times to prevent the perception of image smearing or travel ghost by the audience. The typical shutter used in a motion projector is a simple sheet metal disc, which has two blades whose edges extend radially from a center hub, which is mounted to a drive shaft. The shutter is typically positioned between the light source and the film gate, and periodically blocks the light incident to the film through the projection aperture. Shutter design involves a set of trade-off's around light efficiency, the perception of flicker, and the perception of travel ghost. It happens that human perception of flicker or strobing peaks near the 24 Hz operating frequency of film projectors. To prevent the perception of flicker, the typical shutter has two blades, thereby blocking the light twice per frame (one blockage corresponding to the film indexing time), which raises the apparent illumination frequency to 48 Hz, where flicker perception is significantly reduced. Some systems have even employed three bladed shutters, to yield an effective frequency of 72 Hz, where flicker is barely perceptible. In either of the above cases, these shutters operate at the same 24 Hz rate as the intermittent film driver, and indeed are typically directly linked to the film drive mechanism by a series of worm gears and drive shafts. Alternately, a single bladed shutter driven at 48 Hz or 72 Hz could be employed. Indeed, single bladed shutters are optimal relative to the maximization of screen light and the minimization of travel ghost. However, since single bladed shutters must rotate faster, they generate design, balance, and safety issues, such that they are rarely used. Shutter performance can also be improved by using a shutter disc with a larger diameter, or by positioning the shutter as close as possible to the film plane. In the first case, the shutter blade edges move faster to block the light than is the case for a smaller diameter shutter blade operating at the same speed, and the shutter closure time is reduced. However, size constraints within projector heads typically limit shutters to approx. 4 to 12 inches in diameter. Likewise, physical constraints usually cause the shutter to be positioned an inch or more back from the film gate. Alternately, a shutter with a conical profile has been used as the shutter blade can be positioned closer to the film gate, and the blade velocity across the aperture is more uniform. However, conical shutters have not been widely adopted.

It is a further requirement in shutter design that the multiple blades must be nearly the same size (within a few percent), or else perceptible flicker will be present. Thus, in a cinema projector system employing a standard Geneva mechanism which indexes the film in $\frac{1}{4}$ the frame time, the standard two bladed shutter then blocks 50% of the available light from reaching the screen. Thus, rather than make the shutter blades overly large to avoid the appearance of even the slightest amount of image smear, or "travel ghost," projector manufacturers will use blades which are barely large enough, and then tolerate a small amount of travel ghost.

The perception of travel ghost is a function of both the rate of actual motion of the film as well as the amount of light available to illuminate the film during this motion. It is left to the projectionist to control travel ghost by carefully synchronizing the rotation of the shutter blade with the intermittent action of the Geneva mechanism film driver. For example, travel ghost image smear will appear at the top of the frame when the shutter is late in closing, and will appear at the bottom of the image when the shutter opens too early. Visible travel ghost can occur simultaneously at both the top and bottom of the projected image if both the shutter openings are too large and the shutter is mis-timed with both the beginning and end of the film movement.

A variety of improved shutter designs have been proposed to attempt to maximize light efficiency to the screen while minimizing flicker. For example, the improved shutter described in U.S. Pat. No. 1,700,513 (Porter) has secondary blades, which are mounted to the primary shutter blade disc, and which can be positioned to adjust the size of the shutter openings. By controlling the openings between the radially extending blades in this manner, this shutter is intended to allow both tuning of the light efficiency as well as adjustment for vari-speed projector operation. The shutter described in U.S. Pat. No. 1,884,605 (Dina) also uses a combination of two shutter discs, each with two radially extending blades, whose positions relative to one another can be adjusted to alter the size of the shutter openings, and thus tune available screen light and flicker. In comparison, U.S. Pat. Nos. 3,773,412 and 3,784,293 (Yang) respectively describe shutters with five and four irregularly spaced radially extending blades, where the designed variations in blade position and width are intended to allow maximization of screen light while minimizing flicker.

An alternate approach, described in U.S. Pat. No. 6,014,198 (Baumann) uses a moving plane parallel plate optical compensator, synchronized with the intermittent film movement, to remove the travel ghost effect during shuttering. Accordingly, the screen image of the film appears stationary during a small initial period of time in which the film is actually in motion out of the gate. As during this same initial time period, the shutter blade is already cutting through the illuminating beam, the effective shutter closure time is reduced, although the actual physical closure time is not.

Given these various prior art shutter and projector arrangements, it can be seen advantageous to provide new shutter designs which either reduce the shutter closure time to block light from the projection aperture, or which reduce the time to reach a low light threshold of travel ghost imperceptibility. As a result of reducing either the actual shutter closure time or the travel ghost perception time, the openings of improved shutter can be widened relative to those of the prior art, allowing more light to reach the screen. Furthermore, these improved shutter designs can be combined advantageously with the improved Geneva Mechanism described in the related pending patent application, to further increase screen light. Finally, the improved shutter can be combined with alternate designs for projector illumination systems, to further shorten either the actual shutter closure time or the travel ghost perception time.

SUMMARY OF THE INVENTION

It is therefore the object of the present invention to provide shutter blades for a motion picture film projector which reduce shutter closure time and other problems identified above.

It is the further object of the present invention to provide a shutter blade shaped to meet the edge of the projecting aperture, or the aperture edge as projected back into the incident beam, so that the edge is nearly parallel to the aperture edge, or projection thereof.

It is the further object of the present invention to provide a shutter blade shaped to meet the edge of the projecting aperture, or the aperture edge as projected back into the incident beam, while the shutter axis is not located at the traditional position relative to the illumination aperture, which is at 3 o'clock as viewed as the face of a clock, but is shifted relative to the center of shutter rotation.

According to one aspect of the present invention an improved shutter for a motion picture film projector comprises a Geneva Mechanism which intermittently drives a film. A light source projects light through the film and a shutter periodically interrupts the light source. The shutter has a blade with a shaped edge, which matches the frame shape on the film thus, increasing the amount of light that is transmitted through the film. A second edge of the blade also matches the frame shape on the film further increasing the amount of light transmitted through the film.

According to one embodiment of the invention an altered shape, such that the blade edge at the portion of the shutter which cuts through the actual light beam, does not lie along a radial line through the center of curvature of the shutter, but is shaped to meet the edge of the projecting aperture, or the aperture edge as projected back into the incident beam.

Other embodiments include shaping the blade edged to affect the transition times. For example, the leading and trailing edge transition time can be shaped differently. Likewise, the transition can be shaped to not necessarily follow a single slope in time. Also, this blade edge shaping techniques is not limited to two blade shutters, but can be used with one or three blade shutters for example. Also, for example with a two bladed shutter, the two blades may be shaped differently; if one blade is synched with the movement of the intermittent and the film (and is tuned to help with travel ghost), the other blade could be shaped in a different manner, so long as flicker is controlled. Finally, a shaped blade shutter could be constructed with a small blade and servo motor driver instead of as a rotating disc.

An advantage of the present invention is that the combination of blade shaping and aperture/beam shifting results in a faster transition of the shutter as it cuts through the light beam as compared to the standard shutter of the same size.

The invention and its objects and advantages will become more apparent in the detailed description of the preferred embodiment presented below.

DETAILED DESCRIPTION OF THE INVENTION

Figure 1:
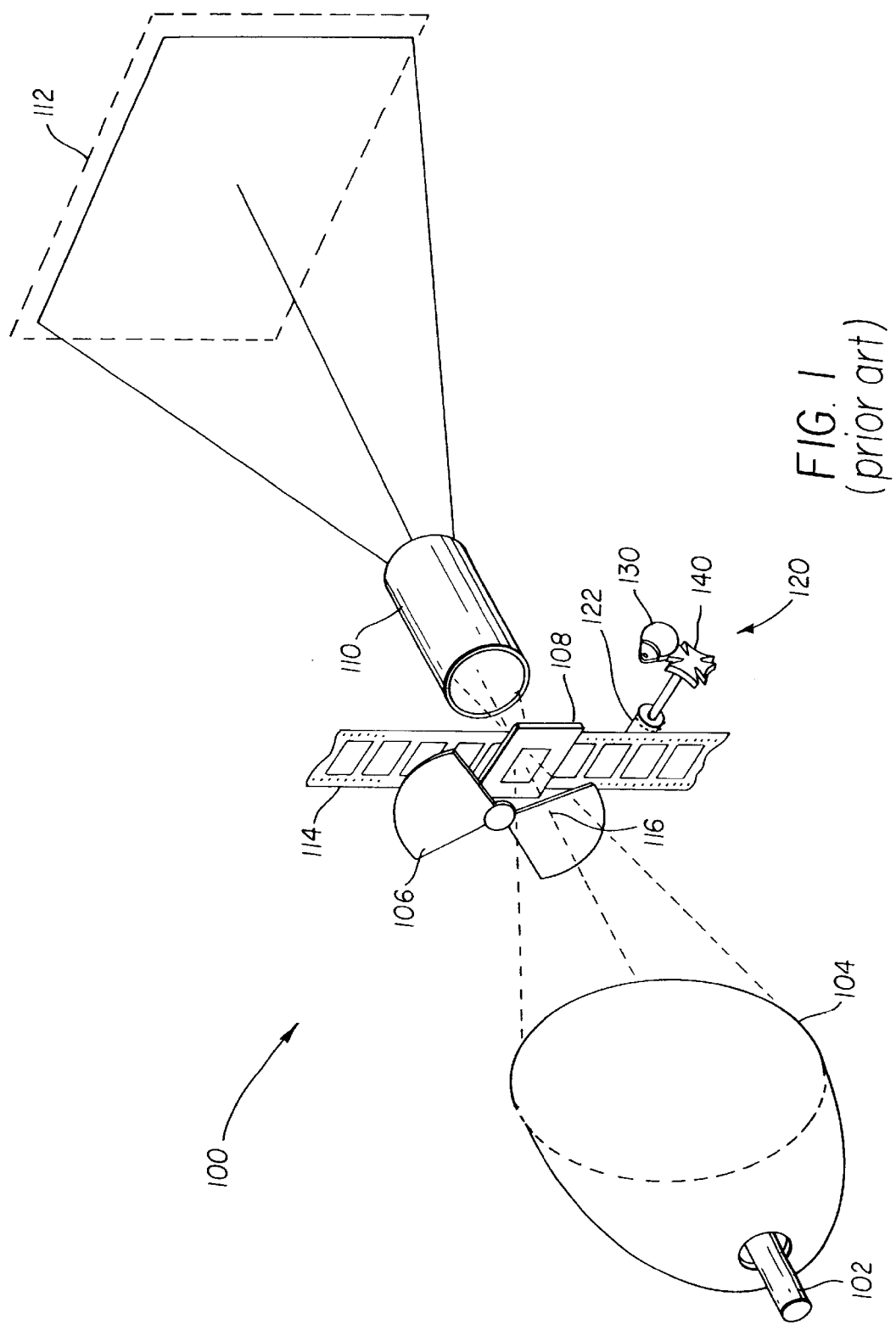
FIG. 1 is a perspective view of a prior art projector, including light source, shutter, projection aperture, film, projection lens, screen, and Geneva mechanism and sprocket.

The traditional prior art motion picture film projector 100 is illustrated in FIG. 1, where a beam of light 116 generated by arc lamp 102. A Projector uses elliptical reflector 104 as beam shaping optics to focus light beam 116 past shutter 300 and through aperture plate 108 to illuminate a frame of the film 114. Said film frame is then imaged by projection lens 110 onto screen 112. Each frame is sequentially moved through the film gate (not shown) and past the aperture plate 108 by sprocket 122, which is driven by Geneva Mechanism 120, whose main components are star wheel 140 and driver 130.

Figure 2:
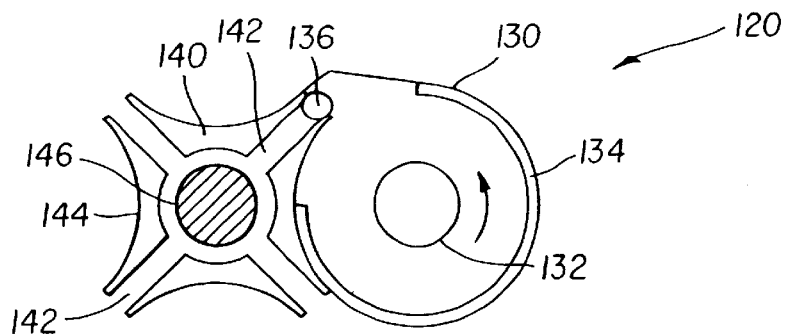
FIG. 2 is a top view of a prior art Geneva mechanism.

The conventional Geneva Mechanism 120 is shown in greater detail in FIG. 2. Geneva Mechanism 120 comprises a driver 130 and a star wheel 140, which together drive a load (such as film) in a controlled intermittent fashion, while driver 130 itself is driven continuously with essentially constant rotary motion. The angular motion of star wheel 140 includes an index followed by a dwell for each revolution of driver 130.

Driver 130 typically includes a drive shaft 132, a restraining cam 134, and a drive arm bearing a drive pin 136. Driver 130 is typically attached to a flywheel (not shown) and a drive motor or gear train (not shown), which provide a constant angular velocity input to driver 130.

Star wheel 140 comprises a shaft 146, which is attached at one end to star wheel 140, and at the other end to a load to be driven. In the case of a motion picture projector, a sprocket (not shown) is attached to the shaft 146, and the sprocket in turn engages with the perforations of the film, thereby transferring the intermittent drive motion to the film (not shown). In the typical Geneva Mechanism, the star wheel 140 comprises a number of straight slots 142, the center lines of which extend radially outward from the center of rotation, and where straight slots 142 are positioned at equal angles about the center of rotation. In between straight slots 142 are a number of concave surfaces 144. Concave surfaces 144 and straight slots 142 alternate around the periphery of star wheel 140 and are equal in number.

During an indexing motion, drive pin 136 enters one of straight slots 142, and then angularly accelerates star wheel 140 about its center of rotation. This acceleration continues until the midpoint of the indexing motion, where drive pin 136 crosses the line joining the centers of rotation of star wheel 140 and driver 130. At this point star wheel 140 begins an angular deceleration which continues until drive pin 136 exits straight slot 142. The star wheel 140 attains its maximum angular velocity at the mid-index position, while both at the beginning and end of index in its angular velocity is zero. As the star wheel 140 depicted in FIG. 2 has four straight slots, its complete motion for one index from rest to peak velocity and back to rest corresponds to 90° of rotation.

Following the indexing motion there occurs a dwell period, during which drive pin 136 is not in engagement with star wheel 140. Driver 130 then rotates to complete one revolution such that it subsequently returns to a position of initial engagement with the next straight slot 142 of star wheel 140. During the dwell period, the star wheel 140 is restrained from any rotation by the engagement of one of its concave surfaces 144 with convex surface of restraining cam 134 of driver 130.

Figure 3A:
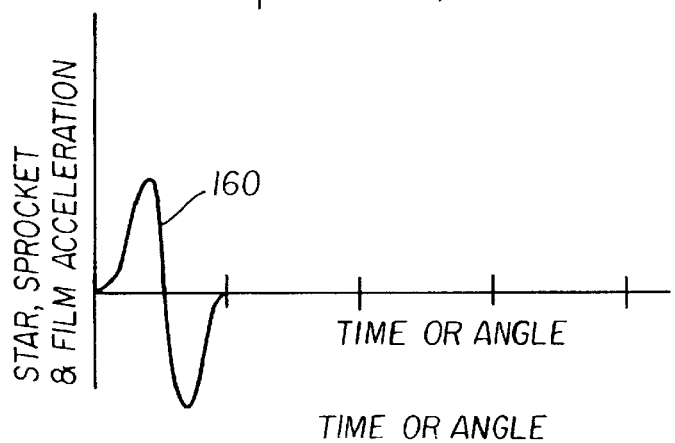
FIGS. 3a–3c are timing diagrams for the motion of the Geneva mechanism and the film.
Figure 3B:
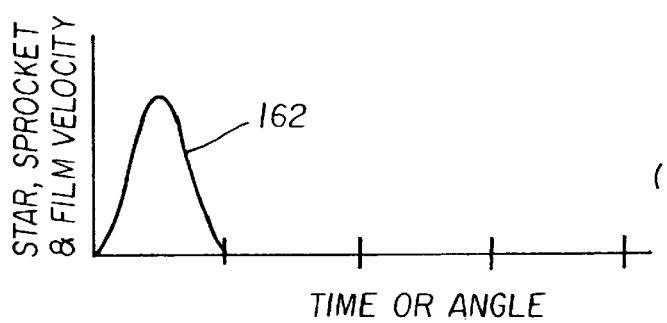
Figure 3C:
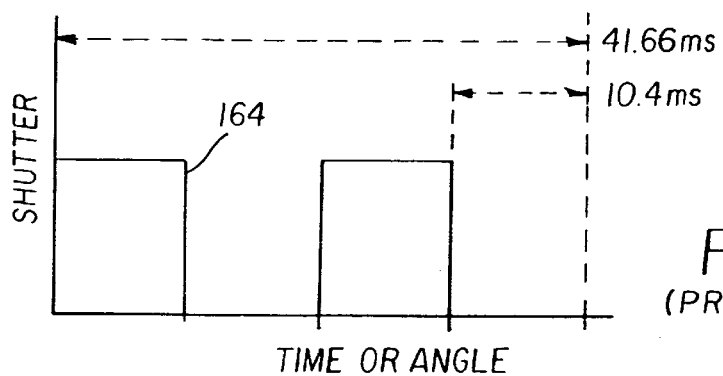

FIGS. 3a, and 3b are plots of angular acceleration 160 and angular velocity 162 of star wheel 140 versus angular displacement of driver 130, for a conventional Geneva Mechanism with four straight slots as shown in FIG. 2. For the approximately first 15° of driver rotation, out of 90°, the star wheel displacement is minimal, and the magnitudes of the acceleration 160 and velocity 162 are relatively low. A similar period of relatively little motion occurs in the final 15° of driver rotation. The motion is slow to start and just as slow stop, however, in a motion picture projector the shutter must be closed during much of this time, because the film is moving. Failure to blank the screen during this period of film motion results in vertical smear, also known as "travel ghost." Thus, as shown in FIG. 3c, the first blanking period 164 of the shutter corresponds to the action of the Geneva Mechanism, as well as the attached sprocket and film.

Figure 4A:
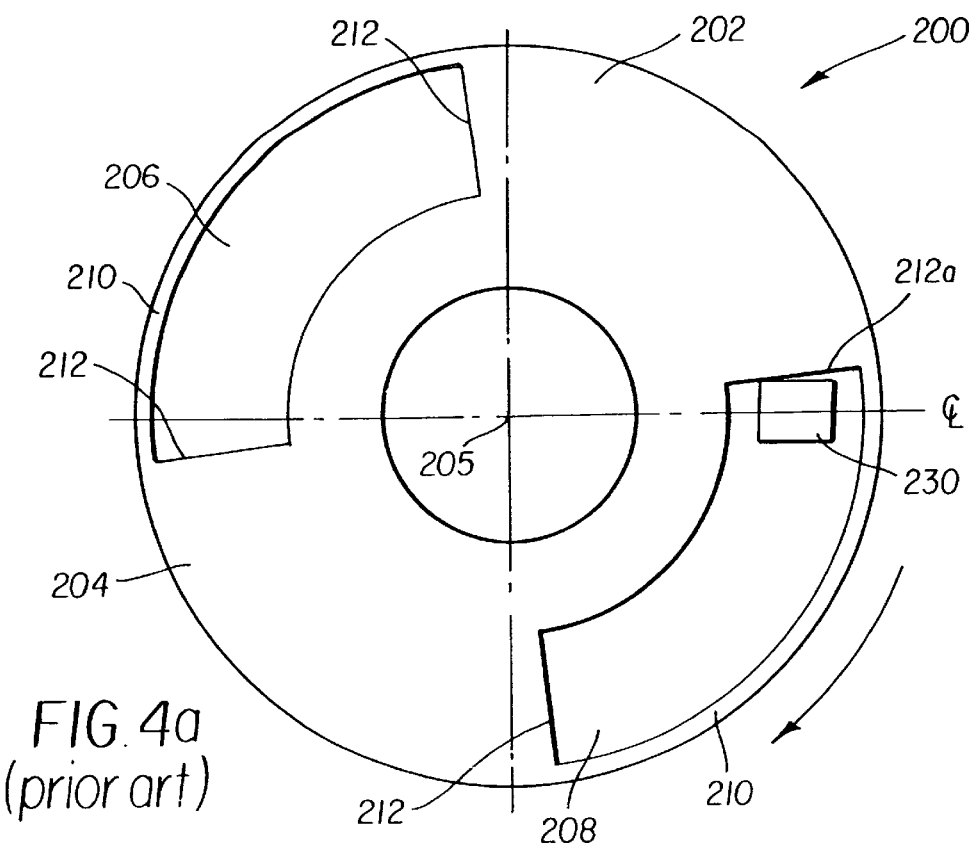
FIGS. 4a and 4b are views of a standard shutter and projection aperture.
Figure 4B:
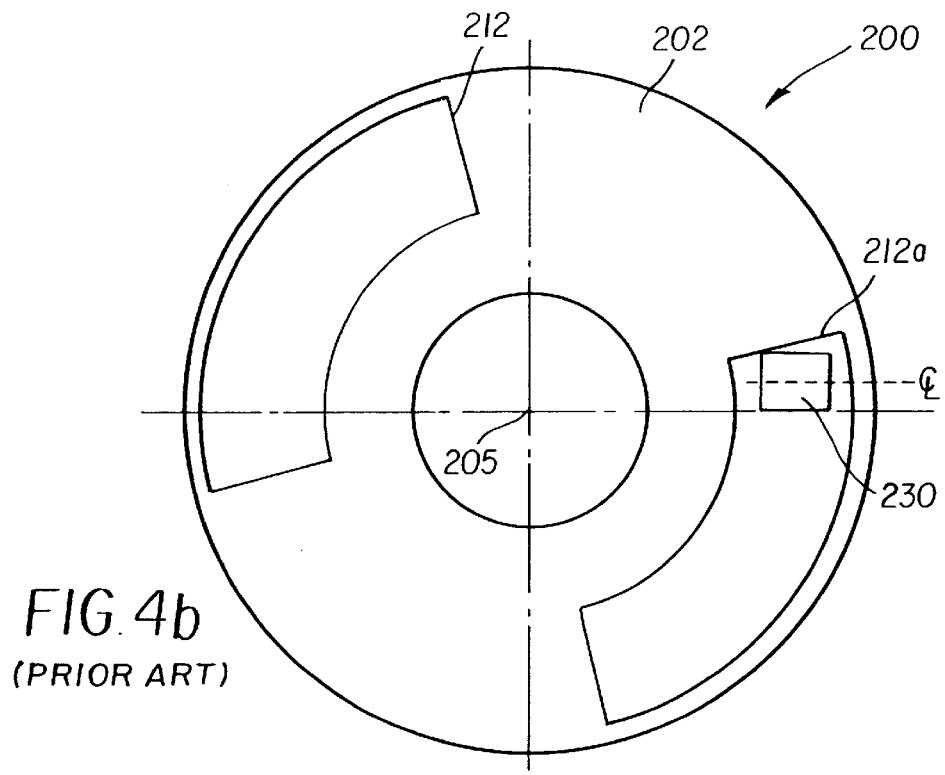

As shown in FIGS. 4a and 4b, a standard two blade shutter 200 consists of two opposed opaque blades 202 and 204, each occupying 90° of arc, with their blade edges 212 extending radially from the center of rotation 205. Likewise, there are two opposed shutter apertures, 206 and 208, each of which also occupies 90° of arc, and through which light is transmitted. The shutter 200 is shown with an optional support 210, which enhances the mechanical rigidity of the entire shutter. The arrow indicates the direction of shutter rotation. Specifically, light passes through rectangular aperture 230 and is incident on the film, unless the light is first obstructed by one of the opaque blades 202 or 204. The center line of the aperture 230 lies on a radial line bisecting the shutter. Both the shutter 200 and the rectangular aperture 230 are scaled to representative dimensions for actual cinema equipment. The shutter 200 has a 4.0 inch outside radius, while the aperture 230 is centered approx. 3.11 inches from the center of rotation 205, and it has approximate dimensions of 17.5×20.9 mm. The leading blade edge 212a is shown to be just in coincidence with a near corner of the aperture 230. To entirely obstruct the aperture 230, the leading blade edge 212a would have to sweep through the angular subtense occupied by the aperture 230, which equals 14.56° for this geometry. At 24 fps operation, this angle corresponds to a closure time of 1.68 ms. Although the typical illumination at the film is typically non-uniform, with a 20+% fall off from screen center to edge not uncommon, it is a fair approximation to assume the total light falling first on the film, and then on the screen, is proportional to the area of the aperture 230.

It should be noted that a very slight improvement in closure time can be obtained by shifting the shutter 200 about the center of the aperture 230, such that the center of rotation 205 is further from the aperture and the subtended angle is minimized. In this example, if the shutters center of rotation is rotated by 0.354 inches the subtended angle is reduced to 14.34°, which equates to a 1.66 ms closure time. In this new configuration, shown in FIG. 4b, the shutter rotation axis is coincident with the bottom of the aperture 230. This minor shift gives potential total 0.1% increase in the available screen light when all four blade edge transitions across the aperture 230 are accounted for.

Figure 5A:
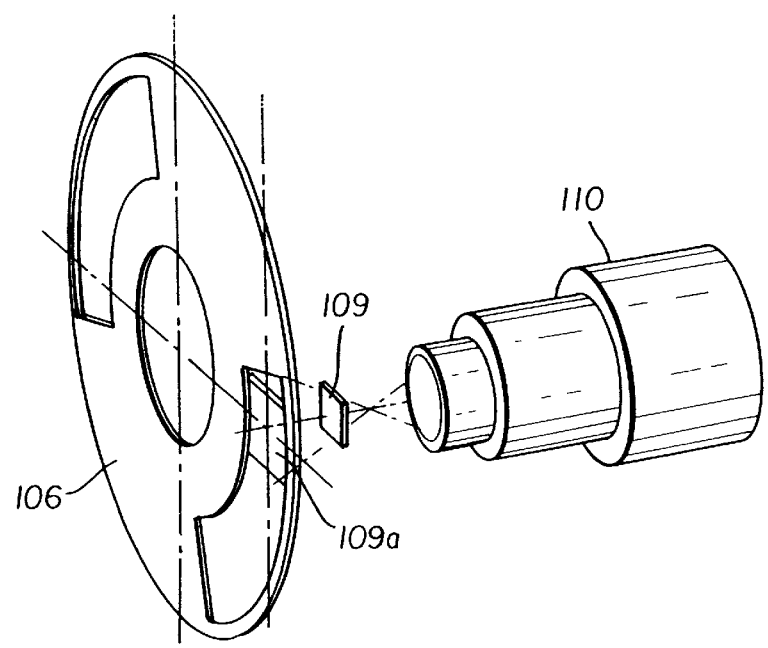
FIGS. 5a and 5b illustrate the relationship of the standard shutter to the aperture and the light passing through it.
Figure 5B:
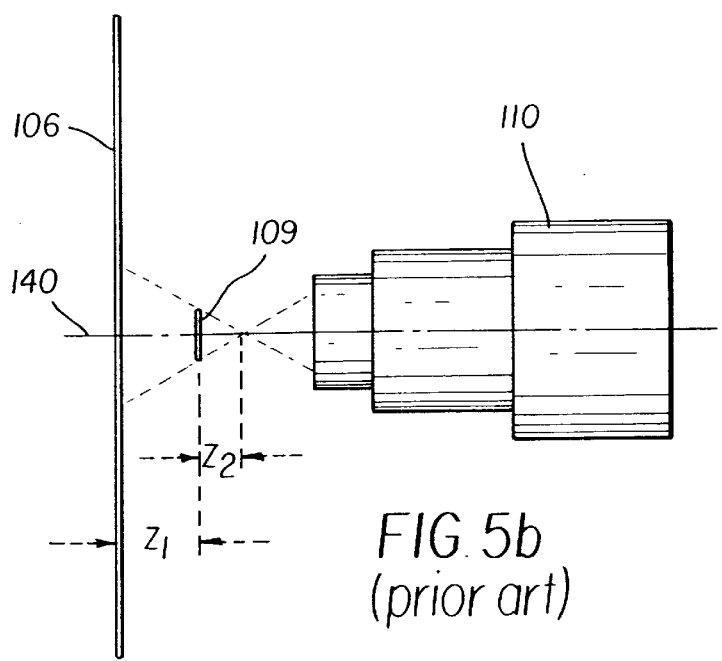

While FIGS. 4a and 4b shows the relationship of the shutter to the aperture, and the blade edge and the subtended angle, FIGS. 5a and 5b shows a more complete picture, which includes the relationship of the shutter to the film aperture, the film plane, and the projection lens. In reality, in most real projectors, the shutter 106 is offset some distance Z1 from aperture 109, and a distance Z1+Z2 from the film plane. The projection lens collects a finite angular range of light, which typically corresponds to an F/2.3 cone. When light rays are projected back to the shutter plane, it can be seen that the effective aperture 109a filled with imaging light is much larger than the linear dimensions of aperture 109 itself. This means that the angle subtended by the aperture as seen by the shutter, and thus the total closure time required for the shutter to block all light passing through the aperture, increases as the distance Z1 between aperture 109 and shutter 106 is increased. The total shutter closure time can be restored to the original time if the shutter dimensions are increased in like proportion with the increase in the area of the effective beam aperture (effective aperture 109a).

The time it takes for the leading blade edge to block both the upper and lower marginal light rays is the total closure time, during which the aperture is blocked and the screen is darkened. This is also known as the "gray time". The perception of travel ghost depends primarily on the amount of the frame that is blocked when the film motion begins. However, it also depends on how well the shutter is synchronized with the film motion, the motion profile of the intermittent pull down mechanism (the Geneva), the distance Z1 between shutter and aperture, the diameter of the shutter, and finally, the shutter configuration used. While the threshold for travel ghost imperceptibility is not an absolute, there are empirical standards used in the field. One such condition applied to the projector operation with a two bladed shutter is that the leading edge of the shutter blade should be at least half way across the aperture when motion begins. This standard, which equates to a 50% light level, will be used to judge the effectiveness of the design improvements described in this application.

Figure 6:
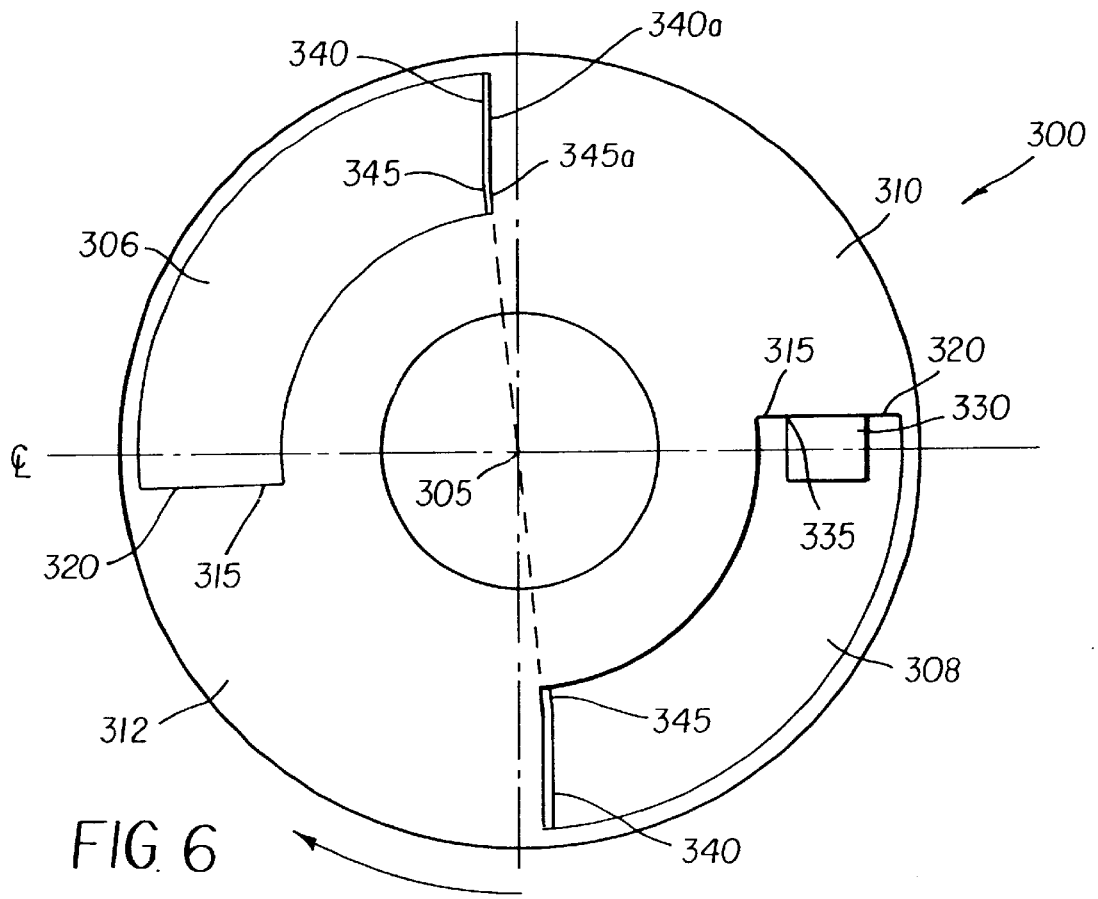
FIG. 6 illustrates a first embodiment of a shutter according to the present invention.
Figure 7:
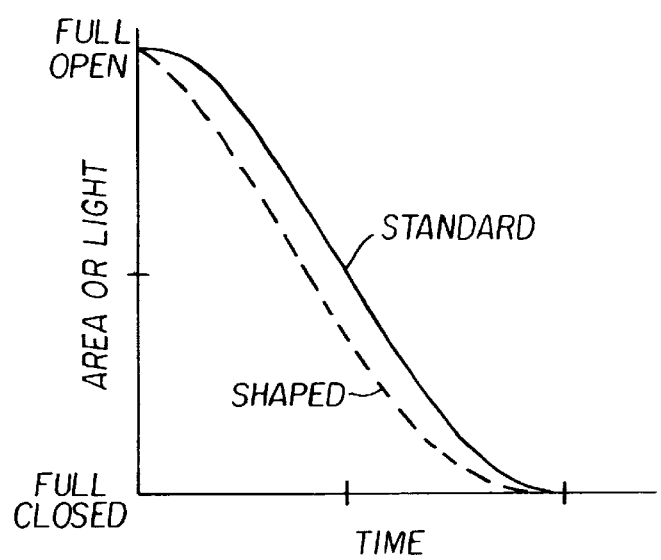
FIG. 7 illustrates the improvement in shutter response of the first and second embodiment shutters.

FIG. 6 shows a first embodiment of the present invention, in which the shutter 300 has been shaped such that the outer leading edge 320 is parallel to the top edge of the aperture 330 when the inner leading edge 315 reaches the inner upper corner 335 of the aperture 330. To accomplish this, the blade 310 is shaped such that the outer portion of the leading edge 320 does not extend along the radius of the shutter, as does the inner portion 315 of the leading edge, but rather protrudes from it. In this configuration, the center line of aperture 330 does cross through the center of rotation 305 of the shutter 300. Likewise, the outer trailing edge 340 of the shutter blade 310 is shaped in mirror image to effect the shutter closure, but rather with material removed. As shown in the plot of FIG. 7, although addition of this material to shape the outer leading edge 320 does not reduce the total closure time, the shutter transition is still accelerated over much of the shutter motion. Thus, it still takes 14.56° of motion, or 1.68 ms in time, to block the aperture. However, at the start of closure, the shutter provides a greater initial blockage than does the standard shutter with a radially extending leading edge. The improved shutter continues to be advantaged for much of its motion relative to the standard shutter, with a larger percentage of the aperture area covered. Thus the flicker imperceptibility threshold of 50% light level is reached more quickly than is the case with the standard shutter. Indeed, the improved shutter has blocked ~7.25% more of the aperture area than has the standard shutter when the standard shutter has reached the point of 50% blockage. Alternately, the improved shutter reaches 50% blockage more quickly, corresponding to an angle of ~6.55°, vs. ~7.28° for the standard shutter.

This improvement of ~0.73 degrees at the leading edge (including portions 315 and 320) is also provided by shaping the trailing edge (including portion 340). Thus the shutter opening can be changed so that the opening is larger and the leading edge starting to cut through the aperture 0.73° later in its motion. As shown in FIG. 6, blade 310 would be reduced by having its trailing edge, as defined edges 340 and 345, shifted radially by 0.73°, to become edges 340a and 345a. The leading edge of blade 310, which is defined by edges 315 and 320, would likewise by shifted to reduce blade 310 by 0.73°, for simplicity this is not shown in FIG. 6. Blade 312 would be similarly reduced in size, such that both shutter openings, apertures 306 and 308, would be increased to ~91.46°. This means that when both blades 310 and 312 of shutter 300 have both the leading and trailing edges reshaped accordingly, the total shutter opening time per frame expanded by (4*0.73 degrees)/360 degrees, to gain 0.8% additional light to the screen as compared to the standard shutter of the same size. This is equivalent to the shutter radius being increased to 3.43 inches, vs. the 3.11 inches in the original case.

Figure 8:
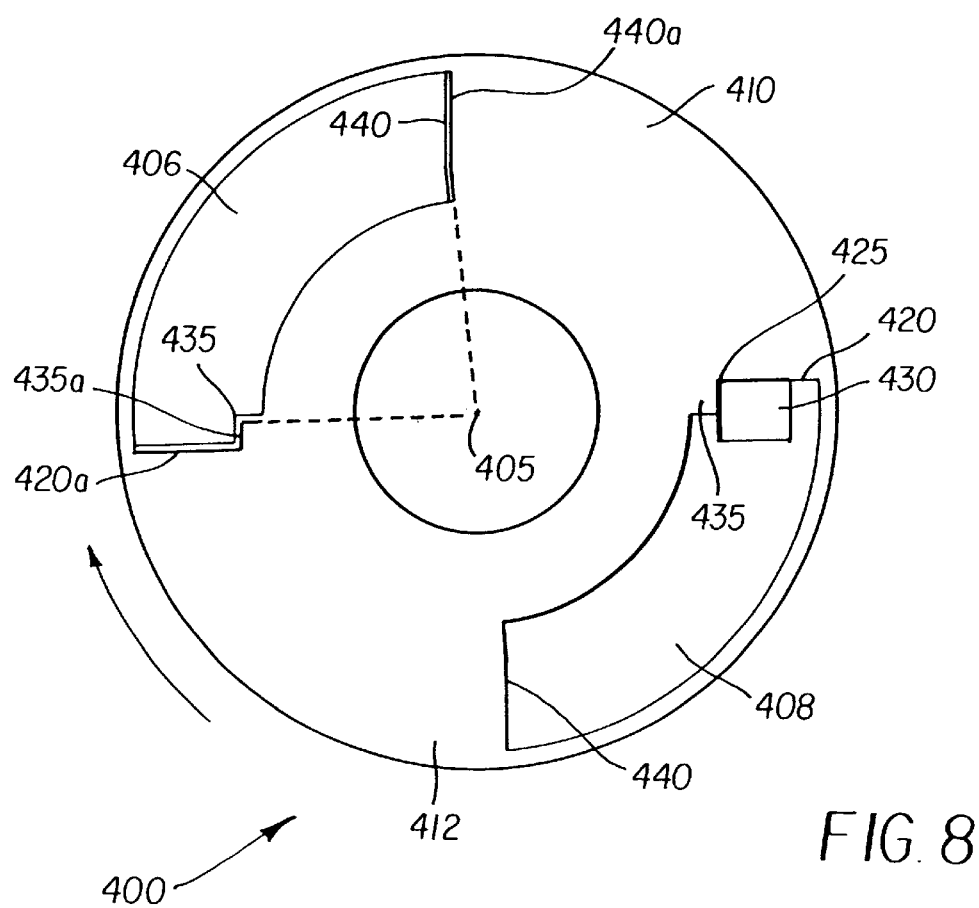
FIG. 8 illustrates a second embodiment of a shutter according to the present invention.

A second embodiment for the improved shutter 400 is shown in FIG. 8. As in the prior embodiment, the center line through the aperture passes through the center of rotation 405. Likewise, the outer portion of the leading edge 420 has been shaped to be parallel to the top edge of the aperture 430 when a radial line extending from the center of rotation 405 reaches the inner upper corner 425 of the aperture 430. However, the blade is additionally shaped so that the inner portion of the leading edge has a blade extension 435 parallel and in proximity to the inner side edge of the aperture 430. It is also shown that the outer portion 440 of the trailing edge of blade 410 has been shaped similarly, but with mirror image cut-outs of removed material. The inner portion 445 of the trailing edge of blade 410 was not shaped in this configuration, as the resulting geometry did not give a worthwhile improvement. This version of the improved shutter, having the added blade extension 435, has slightly enhanced performance as compared to the improved shutter of the first embodiment which lacks blade extension 435. More precisely, this second version of the improved shutter blocks ~7.57% more of the aperture area than has the standard shutter when the standard shutter has reached the point of 50% blockage. Thus, this second shutter design reaches the 50% the travel ghost imperceptibility threshold with a rotation of ~6.26°, which is ~1.0° of rotation quicker than the standard shutter. When both blades 410 and 412 of shutter 400 have both the leading and trailing edges reshaped by enlarging the shutter openings 406 and 408, as illustrated with exemplary new leading edges 420a and 435a, and new trailing edges 440a, the total shutter opening time per frame can be expanded by (4*1.0 degrees)/360 degrees, to gain 1.1% additional light to the screen as compared to the standard shutter of the same size. This is equivalent to the shutter radius being increased to 3.58 inches relative to the original 3.11 inches.

Figure 9:
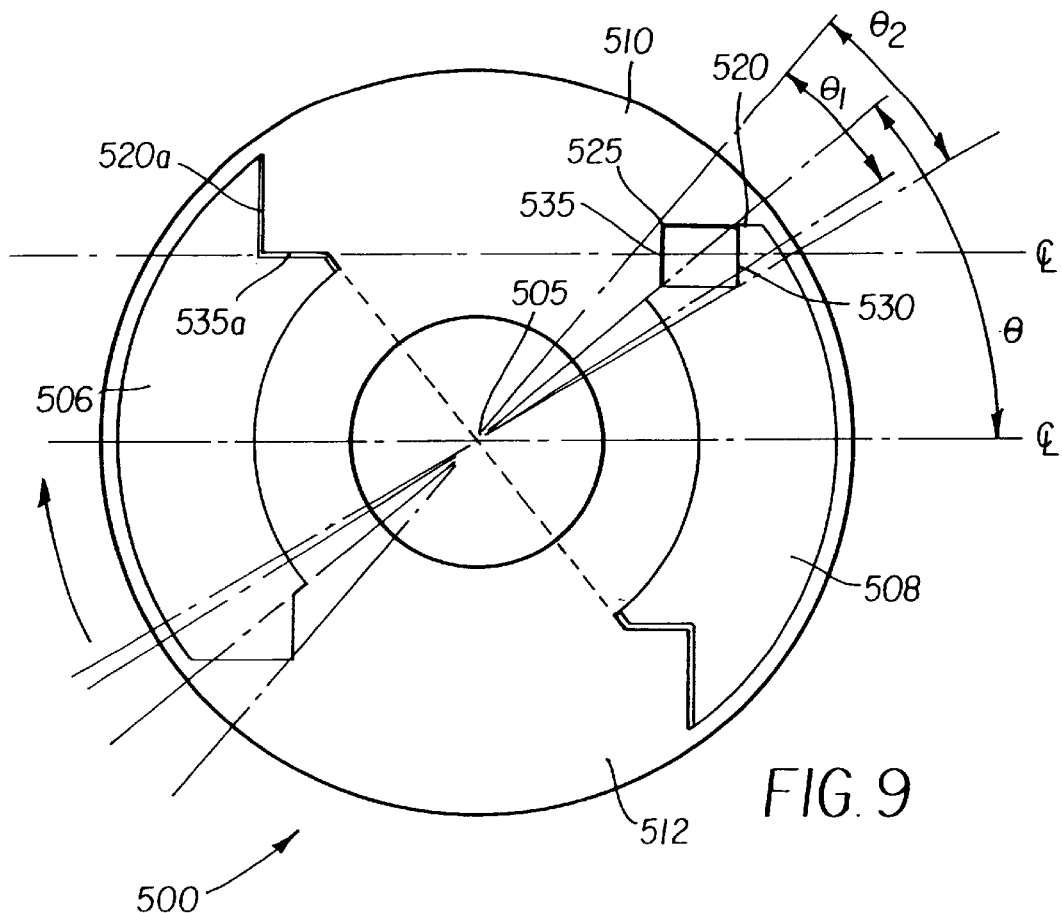
FIG. 9 illustrates a third embodiment of a shutter according to the present invention.
Figure 10:
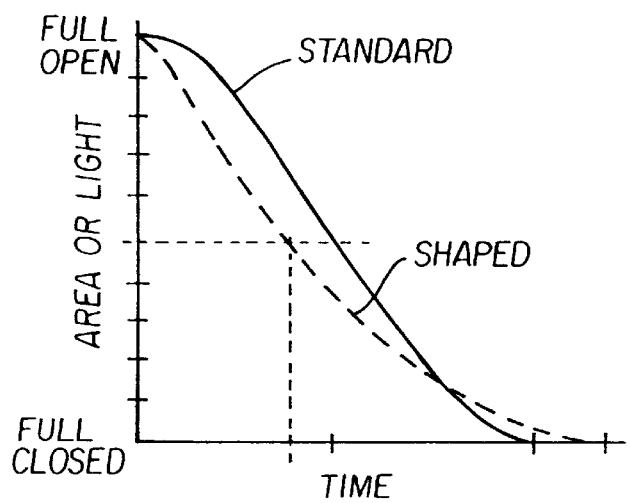
FIG. 10 illustrates the improvement in shutter response of the third embodiment shutter.

In a third embodiment, shown in FIG. 9, the shutter 500 has been pivoted relative to the aperture 530, such that the diagonal through the aperture passes through the center of rotation 505. In this configuration, aperture 530 is rotated about the shutters center of rotation 505 by 39.9° relative to the original position, where its center line crossed through the shutters center of rotation. As with the second embodiment, the outer portion of the leading edge 520 has been shaped to be parallel to the top edge of the aperture 530, but the blade is additionally shaped so that the inner portion of the leading edge has a blade extension 535 parallel and in proximity to the inner side edge of the aperture 530. Blade extension 535 begins at the inner upper corner 525 of aperture 530, and then extends the width of the aperture. Thus, these leading edge blade extensions 520 and 535 are much larger than the comparable extensions provided for the second embodiment shutter. A standard shutter of with the same 4.0 inch radius, but positioned at an acute angle of ~40° to the aperture 530 would actually require more angular motion ($\theta_2$=9.3°) and time to traverse the aperture to totally close it off. Likewise, this third embodiment shutter, which has the leading edge of blade 510 shaped with outer leading edge portion 520, and inner leading edge portion 525 also requires a greater angle of rotational motion ($\theta_1$=17.22°) to provide total closure than does the standard shutter. Thus, as shown in FIG. 10, the required time for total closure with the improved third embodiment shaped shutter is ~20% larger than the total closure time of the standard shutter. However, as shown in FIG. 10, the third embodiment shutter is advantaged relative to the standard shutter over much of its motion. That is, by positioning shutter 500 at an acute angle θ=39.9° and adding aggressive leading edge blade shaping, the rotational motion required to cover 50% of the area of aperture 530, corresponding to the 50% travel ghost imperceptibility threshold is reduced to 5.6°. Thus, as compared to the standard shutter which reaches 50% closure with 7.28° motion, the third embodiment shutter requires ~1.68° less rotational motion for the same effect. As before blade shaping can be applied to the leading and trailing edges of both blades of shutter 500, for example as illustrated at the trailing edge of blade 510, with an outer shaped edge 520a and inner shaped edge 535a. With these changes, shutter 500 would have shutter blades 510 and 512 which would each be ~86.6° wide, while shutter openings 506 and 508 each would be ~93.4° wide. In order to minimize flicker, the blades and opening should be identical size, and spaced symmetrically about the axis of rotation 505. In combination, with the leading and trailing edges shifted to expand the shutter openings and provide faster transition to 50% closure, the total shutter opening time per frame can be expanded by (4*1.7 degrees)/360 degrees. This is a gain 1.9% additional light to the screen as compared to the standard shutter of the same size. This is equivalent to the shutter radius being to 3.95 inches as compared to the original 3.11 inch radius. While the performance of improved shutter 500 is maximized with projection aperture 530 positioned such that the diagonal through the aperture passes through the center of rotation 505, it should be understood that this angular position can be shifted modestly in either direction while realizing most of the cited improvements.

Figure 11:
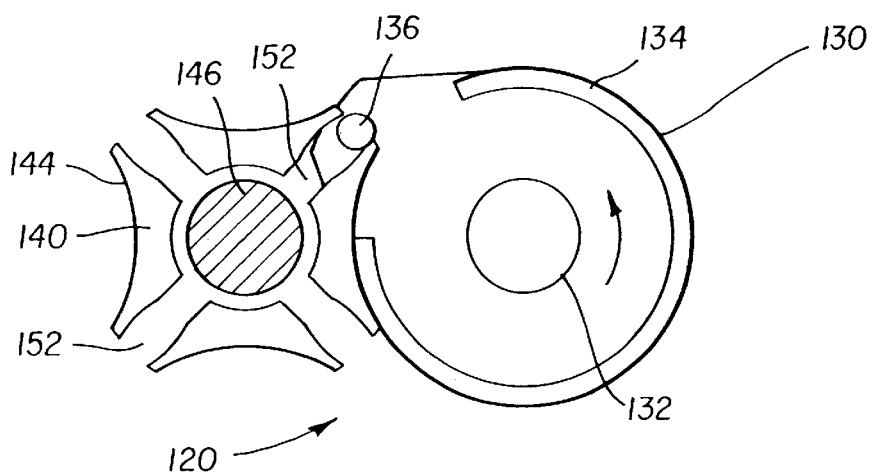
FIG. 11 illustrates an improved Geneva Mechanism.
Figure 12A:
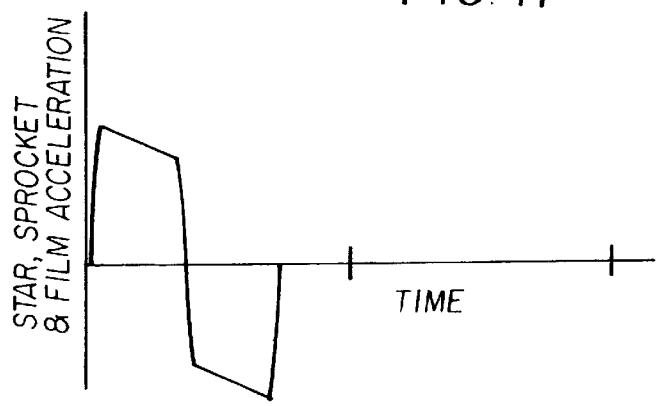
FIGS. 12a–c illustrate the timing diagram for the new Geneva Mechanism.
Figure 12B:
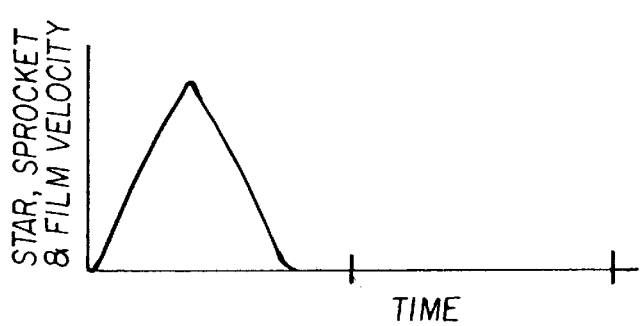
Figure 12C:
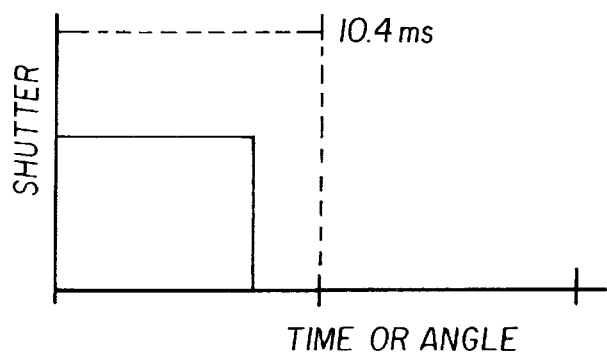

The design for an improved Geneva Mechanism, which is described in greater detail in co-pending patent application Ser. No. 09/329,841 shown in FIG. 10. This new Geneva mechanism 120 is similar to the standard mechanism discussed previously (FIG. 2), except that the curved slots 152 in the mechanism are shaped. FIG. 11 shows the timing diagram for this new Geneva, relative to the acceleration and velocity profiles describing the motion of the star wheel 140 as it undergoes an index. According to the design principles developed for this new Geneva mechanism, the drive pin 136 enters the curved slots 152 than is the case with the standard mechanism. The curved slots 152 are shaped to produce a time period of prolonged near peak acceleration prior to mid index, and a similar prolonged period of deceleration after mid index, after which the deceleration is rapidly reduced to zero. FIG. 12 shows this characteristic acceleration profile, as well as the resulting velocity profile for the star wheel 140. As compared to the standard mechanism, the new mechanism produces an index of the star wheel 140, and also for the attached sprocket and film, which is considerably quicker than the standard mechanism, without also requiring great increases in the peak acceleration experienced by the star wheel, sprocket, and film. As described in the related application, proper shaping of the curved slots 152 produces controlled acceleration enhancements, yielding ~30% more light to the screen per film frame. Comparison of the timing diagram for the standard Geneva mechanism (FIG. 3) and the improved Geneva mechanism (FIG. 12) shows that the acceleration and velocity motion profiles for the improved Geneva are shorter and more abrupt at the beginning and end of index.

On the one hand, the faster initial motion experienced by the film when driven by this improved Geneva mechanism should reduce the potential for perception of travel ghost. On the other hand, a long shutter transition time to a light threshold for low travel ghost perceptibility means that screen light is being reduced significantly at a time when the film is stationary. Therefore the light efficiency of a motion picture projector employing the improved Geneva mechanism 120 with curved slots 152 would be further enhanced by the use of a shutter with either a faster closure time, or a faster transition time to a low travel ghost perceptibility threshold.

Any of the previous described embodiments for improved shutters with blade shaping of the leading and trailing edges could be used in a projector utilizing either the standard Geneva Mechanism, or the just described improved Geneva Mechanism. While the gains in screen light with shutter edge shaping are a modest few percent, as compared to the 30% or more improvements offered by the improved Geneva, the shutter gains are nonetheless useful, particularly as the gains are achieved without requiring an increase in shutter size, thus minimizing the impact on the projection design. While the third embodiment shutter, which provides the greatest gains, does not require an increase in the shutter size, it does not require a significant positional shift of the axis of rotation. Also, it should be understood that while shutter offset from the gate along the optical axis, as shown in FIGS. 5a and 5b, increases the time for shutter closure to either 50% or 100% closure, the gains provided by blade shaping of the leading and trailing edges, still apply as long as the shutter cuts through an effective beam (as defined by the aperture and the projection lens) of largely rectangular profile. This condition holds as long as the shutter is located within a few inches of the film gate, as opposed to being near the lamp source (the lamp and reflector of FIG. 1), where the beam is round in cross-section.

Shutter effectiveness can also be improved by changing the relationship of the shutter to the illumination system. As illustrated in FIG. 1, motion picture projectors use a relatively simple illumination system, where elliptical reflector 104 serves as the beam shaping optics to collect and focus the light emitted by arc lamp 102 into a beam 116 which is then incident on the film 114. Shutter 106 is basically positioned as close to the film gate or aperture 108 as is physically reasonable, but as discussed previously, relative to FIG. 5, the inevitable offset causes the time for the shutter to provide total closure to increase. However, design changes in the illumination optics, which could be considered simply for the improvements in light efficiency and uniformity to the screen, also offer opportunities to improve the shutter response. For example, in the optical system shown in FIG. 13, the light emitted by arc lamp 102 is focussed by elliptical reflector 104 onto plane $a_1$. The light is then directed through beam shaping optics comprising a fly's eye integrator assembly consisting of field lens 172a, lenslet arrays 170, and field lens 172b, such that a plane of very uniform illumination is created at plane $b_2$. Lens 172c is a field lens relative to plane $b_2$, and may be used to image light into the pupil of lens 172d, boosting the system light efficiency going forward. In one example of use for this system, the film could be located in proximity to plane $b_2$, and lens 172d would be the projection lens, which images the film at high magnification onto a screen located at plane $b_3$. Optional diffuser 174 may be placed prior to the film, to diffuse the light onto the film for the purpose of suppressing scratches and dirt. The shutter could of course be placed in this system in the vicinity of plane $b_2$, but before (closer to the lamp) the film. Depending on the details of the design, the shutter (not shown) may be placed either before or after field lens 172c. As thus described, this layout offers few advantages relative to the shutter operation. Alternately, the shutter could be located elsewhere in the system, and most optimally in the vicinity of plane $a_1$, where the beam is typically the smallest and generally circular in cross-section. As such a shutter, shown in FIG. 13 as shutter 106, could likely be located closer to plane $a_1$, than a similar shutter would be relative to a film gate near plane $b_2$, the shutter near the $a_1$ plane would be further advantaged relative to cutting through a small beam. Furthermore, as shown in FIG. 14, a shutter 600, which is intended for operation at the $a_1$ plane, where the beam has a nominally circular cross-section 630, could be further optimized for reduced transition times for beam closure (to 50% closure for example) by shaping both the leading and trailing edges 620 and 625 of the blades to have curved profiles. Additionally, a shutter operating at or near plane a, would be further advantaged, relative to closure times and masking travel ghost, by the nature of the illumination system, which would cause the entire illuminated aperture at plane $b_2$ to transition from white to gray to black (no light), as the shutter is closed. As such, the shutter would act as a dimming shutter, rather than a progressive shutter, and make travel ghost more difficult to perceive.

Figure 13:
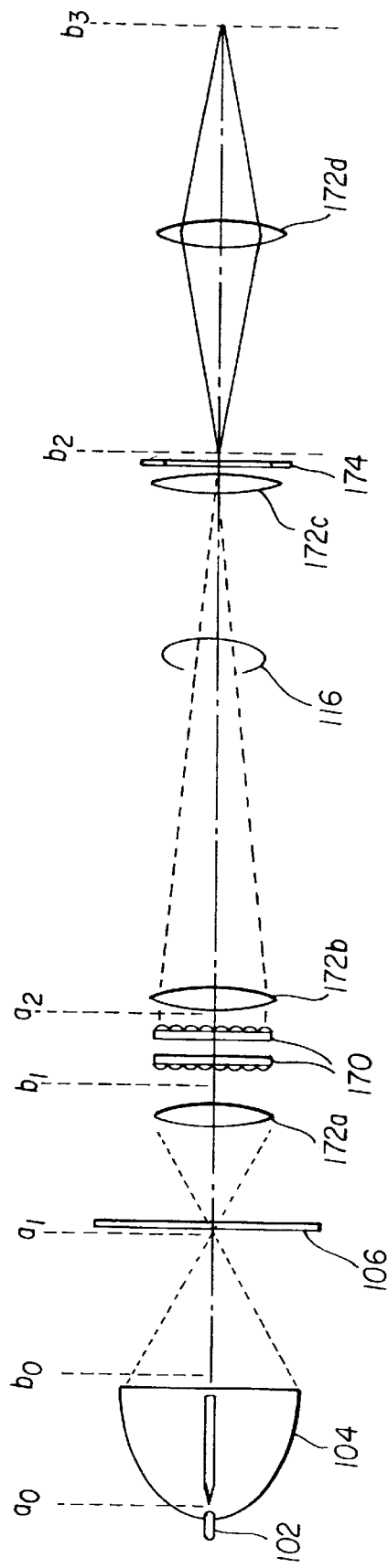
FIG. 13 illustrates an alternate projector illumination optics and shutter positions.
Figure 14:
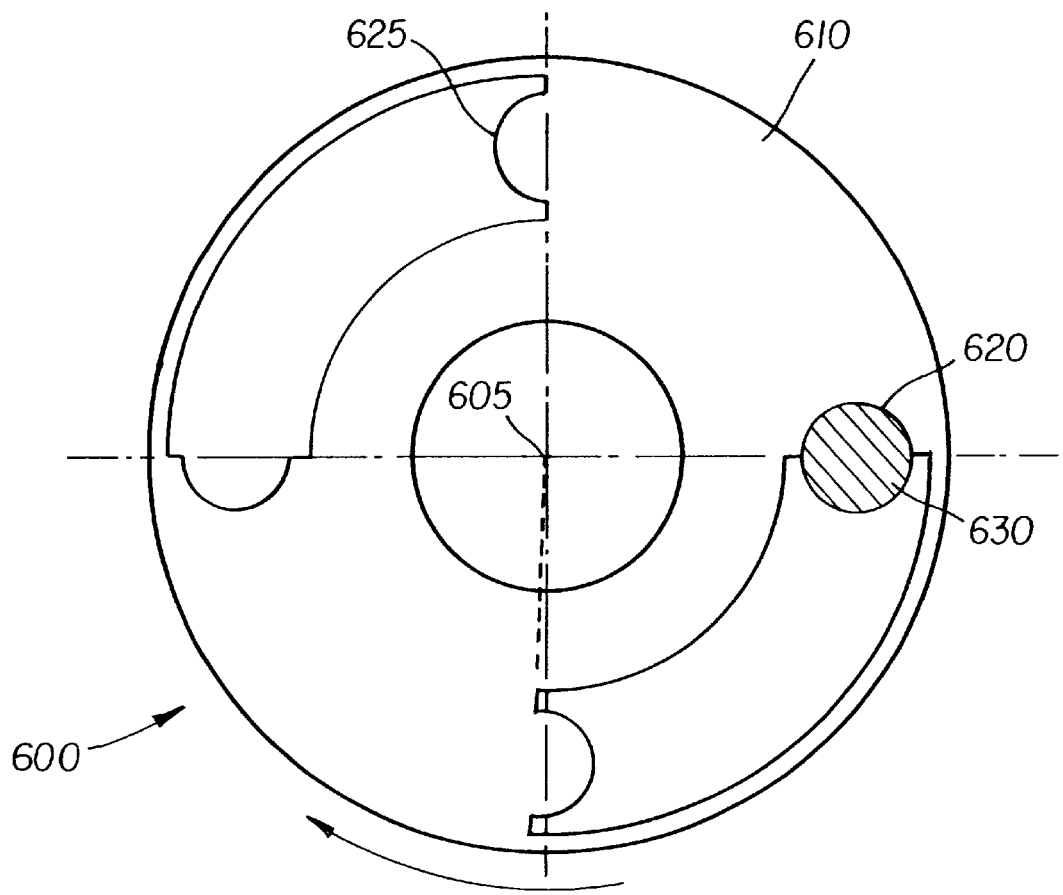
FIG. 14 illustrates a fourth embodiment of a shutter according to the present invention.

The system of FIG. 13 could be used in yet another way to advantage the shutter operation. The Fly's Eye integrator assembly could be used to provide illumination to an intermediate illumination plane located at plane $b_2$. The optics would be designed to provide a rectangular area of uniform illumination with the same aspect ratio as the film frame, but of smaller size. Lens 172d would then be used to magnify this area to be the proper size to illuminate the full film frame, with the film located at plane $b_3$. Yet another lens (not shown), positioned beyond plane $b_3$, would be used to project an image of the illuminated film at plane $b_3$ to the screen (not shown). The optional diffuser 174, if used, would not be located near plane $b_2$, but rather near plane $b_3$, though preceding the film. The shutter, which could be based on any of the advantaged designs, from the first, second, or third embodiments, would be further improved by cutting through a smaller beam of light than is possible in the traditional system of FIG. 1. In this case, the shutter would again act progressively across the aperture to block the light, rather than being a dimming shutter like the prior cases, where shutter 106 (either standard or shaped (FIG. 14)) is located at the $a_1$ plane.

Other options include shaping the blade edges to affect the transition times. For example, the leading and trailing edge transition time can be shaped differently. Likewise, the transition can be shaped to not necessarily follow a single slope in time. Also, blade edge shaping techniques are not limited to two blade shutters, but can be used with one or three blade shutters. Also, for example with a two bladed shutter, the two blades may be shaped differently; if one blade is synched with the movement of the intermittent and the film and is tuned to help with travel ghost, the other blade, which shutters while the film is stationary, could be shaped in a different manner, so long as flicker is controlled. Finally, a shaped blade shutter could be constructed with a small blade and servo motor driver instead of as a rotating disc.

The invention has been described in detail with particular reference to certain preferred embodiments thereof, but it will be understood that variations and modifications can be effected within the scope of the invention.

PARTS LIST

100. Motion picture film projector
102. Arc lamp
104. Elliptical reflector
106. Shutter
108. Aperture plate
109. Aperture
109a. Effective aperture
110. Projection lens
112. Screen
114. Film
116. Beam of light
120. Geneva Mechanism
122. Sprocket
130. Driver
132. Drive shaft
134. Restraining cam
136. Drive pin
140. Star wheel
142. Straight slots
144. Concave surfaces
146. Shaft
152. Curved slots
160. Angular acceleration
162. Angular velocity
164. Blanking period
170. Lenslet arrays
172a. Field lens
172b. Field lens
172c. Field lens
172d. Lens
174. Optional diffuser
200. Shutter
202. Opaque blade
204. Opaque blade
205. Center of rotation
206. Shutter aperture
208. Shutter aperture
210. Optional support
212. Blade edge
212a. Leading blade edge
230. Aperture
300. Shutter
305. Center of rotation
306. Aperture
308. Aperture
310. Blade
312. Blade
315. Inner leading edge
320. Outer leading edge
330. Aperture
335. Inner upper corner
340. Outer trailing edge
340a. Edge
345. Edge
345a. Edge
400. Improved shutter
405. Center of rotation
406. Shutter opening
408. Shutter opening
410. Blade
412. Blade
420. Outer leading edge
420a. New leading edge
425. Inner upper corner
430. Aperture
435. Blade extension 435a. New leading edge
440. Outer portion
440a. New leading edge
445. Inner portion
500. Shutter
505. Center of rotation
506. Shutter opening
508. Shutter opening
510. Blade
512. Blade
520. Outer leading edge
520a. Outer shaped edge
525. Inner leading corner
530. Aperture
535. Blade extension
535a. Inner shaped edge
600. Shutter
620. Leading edge
625. Trailing edge
630. Circular cross-section

What is claimed is:

1. An improved motion picture film projector comprising:
   a Geneva Mechanism for intermittently driving a film comprised of multiple frames;
   a light source which illuminate said film with incident light;
   beam shaping optics located between said light source and said film for shaping said incident light;
   an aperture which defines each of said frames;
   a projection lens for imaging each of said frames to an image plane;
   a shutter comprising at least one blade having a leading edge and a trailing edge for periodically interrupting said incident light on said film from said light source; and
   wherein at least one of said edges has a shape which matches a shape of said aperture.

2. An improved motion film projector as in claim 1 wherein said shutter is located between said aperture and said light source.

3. An improved motion picture film projector as in claim 1 wherein said shutter blade edge matches a top edge of said aperture.

4. An improved motion picture film projector as in claim 1 wherein said shutter interrupts said incident light during a rotation of said shutter more quickly than a shutter blade not having a shaped edge.

5. An improved motion picture film projector as in claim 1 wherein both of said shutter blade edges have shapes which match said shape of said aperture.

6. An improved motion picture film projector as in claim 1 wherein;
   said shutter comprises two blades each of said blades having a leading edge and a trailing edge for periodically interrupting said incident light on said film from said light source; and
   wherein at least one of said edges on each of said blades has a shape which matches said shape of said aperture.

7. An improved motion picture film projector in claim 1 wherein a relative position of said shutter and said aperture is defined by a line bisecting an axis of rotation of said shutter and which is perpendicular to one edge of said aperture.

8. An improved motion picture film projector in claim 1 wherein a relative position of said shutter and said aperture is defined by a line bisecting an axis of rotation of said shutter is collinear with a centerline of said aperture.

9. An improved motion picture film projector in claim 1 wherein a relative position of said shutter and said aperture is defined by a line bisecting an axis of rotation of said shutter is collinear with a line bisecting an edge of said aperture.

10. An improved motion picture film projector as in claim 1 wherein a relative position of said shutter and said aperture is defined by a line bisecting an axis of rotation of said shutter and two opposite corners of said aperture.

11. An improved motion picture film projector in claim 1 wherein a relative position of said shutter and said aperture is defined by a line bisecting an axis of rotation of said shutter and which forms an angle with one edge of said aperture.

12. An improved motion picture film projector as in claim 1 wherein said leading and trailing edges of said shutter blade are shaped to match a top edge and a side edge of said aperture.

13. An improved motion picture film projector according to claim 1 wherein an angular size of said shutter blades is less than an angular size of shutter blades without shaping.

14. An improved motion picture film projector comprising:
    a Geneva Mechanism for intermittently driving a film comprised of a plurality of frames;
    a light source which illuminate said film with incident light;
    beam shaping optics located between said light source and said film for shaping said incident light;
    an aperture which defines each of said frames;
    a projection lens for imaging each of said frames to an image plane;
    a shutter comprising at least one blade having a leading edge and a trailing edge for periodically interrupting said incident light on said film from said light source; and
    wherein said leading and trailing edges have shapes which match a shape of said aperture.

15. An improved motion picture film projector according to claim 14 wherein an angular size of said shutter blades is less than an angular size of shutter blades without shaping.

16. An improved motion picture film projector as in claim 14 wherein said light source comprises an arc lamp and an elliptical reflector.

17. An improved motion picture film projector as in claim 16 wherein said beam shaping optics comprises a fly's eye integrator assembly including at least one pair of lenslet arrays and several field lenses which together provide a plane of uniform illumination.

18. An improved motion picture film projector as in claim 17 wherein said shutter is placed prior to said plane of uniform illumination.

19. An improved motion picture film projector as in claim 17 wherein said shutter is placed at a focus of said elliptical arc lamp and said leading and trailing edges of said shutter are shaped to follow a round profile of a beam formed by said arc lamp and said elliptical reflector.

20. An improved motion picture film projector as in claim 19 wherein said shutter is placed within said beam shaping optics to act as a dimming shutter.

* * * * *